United States Patent
Jean et al.

(10) Patent No.: US 9,279,409 B2
(45) Date of Patent: Mar. 8, 2016

(54) ENVIRONMENTAL ELECTRICAL GENERATOR

(75) Inventors: Philippe F. Jean, Nice (FR); Arnaud Fourmon, Nice (FR)

(73) Assignee: SINGLE BUOY MOORINGS, INC., Marly (CH)

( * ) Notice: Subject to any disclaimer, the term of this patent is extended or adjusted under 35 U.S.C. 154(b) by 668 days.

(21) Appl. No.: 12/800,509

(22) Filed: May 17, 2010

(65) Prior Publication Data

US 2010/0314871 A1    Dec. 16, 2010

Related U.S. Application Data

(60) Provisional application No. 61/224,329, filed on Jul. 9, 2009, provisional application No. 61/187,597, filed on Jun. 16, 2009.

(51) Int. Cl.
*F03B 13/18* (2006.01)
*H02N 1/08* (2006.01)
*F03B 13/20* (2006.01)

(52) U.S. Cl.
CPC .............. *F03B 13/20* (2013.01); *F03B 13/185* (2013.01); *F03B 13/1855* (2013.01); *H02N 1/08* (2013.01); *F05B 2220/706* (2013.01); *F05B 2220/7066* (2013.01); *F05B 2240/917* (2013.01); *Y02E 10/38* (2013.01)

(58) Field of Classification Search
CPC .... F03B 13/185; F03B 13/1855; F03B 13/20; H02N 1/08; Y02E 10/38
USPC ......... 290/42, 53; 60/497; 310/339, 800, 317, 310/318
See application file for complete search history.

(56) References Cited

U.S. PATENT DOCUMENTS

| | | | |
|---|---|---|---|
| 4,126,822 A | | 11/1978 | Wahlstrom |
| 4,127,804 A | * | 11/1978 | Breaux .......................... 322/2 A |
| 4,151,409 A | | 4/1979 | O'Hare |
| 4,404,490 A | * | 9/1983 | Taylor et al. .................. 310/339 |
| 6,936,994 B1 | | 8/2005 | Gimlan |
| 7,632,041 B2 | | 12/2009 | Jean et al. |
| 2007/0103033 A1 | * | 5/2007 | Martin .......................... 310/317 |
| 2007/0257490 A1 | * | 11/2007 | Kornbluh et al. ............... 290/53 |
| 2009/0072658 A1 | * | 3/2009 | Benslimane et al. .......... 310/300 |

FOREIGN PATENT DOCUMENTS

| | | |
|---|---|---|
| WO | WO 2008/112583 A1 | 9/2008 |
| WO | WO 2009/106836 A2 | 9/2009 |

* cited by examiner

*Primary Examiner* — Tulsidas C Patel
*Assistant Examiner* — Viet Nguyen
(74) *Attorney, Agent, or Firm* — Young & Thompson

(57) ABSTRACT

An electricity generator having variable capacitors that each includes a repeatedly stretched and relaxed sheet (20, FIG. 3) of SM (stretchable material) and electrodes (22, 24) lying against opposite faces of the sheet, which includes a power extraction unit (110, FIG. 9) coupled to the electrodes of at least a pair of capacitors that are activated out of phase with each other. The unit directs an electrical charge (current) from a first pair of electrodes that have a higher voltage, to one or more second pairs of electrodes that have a lower voltage, to recharge the second pairs of electrodes. During the current flow electrical power is extracted by the drop in voltage of current passing through the unit. The power extraction unit can be provided with a control unit that has voltage detectors (54) and that selectively connect capacitors, based on their voltages, for maximum efficiency in generating power output.

1 Claim, 6 Drawing Sheets

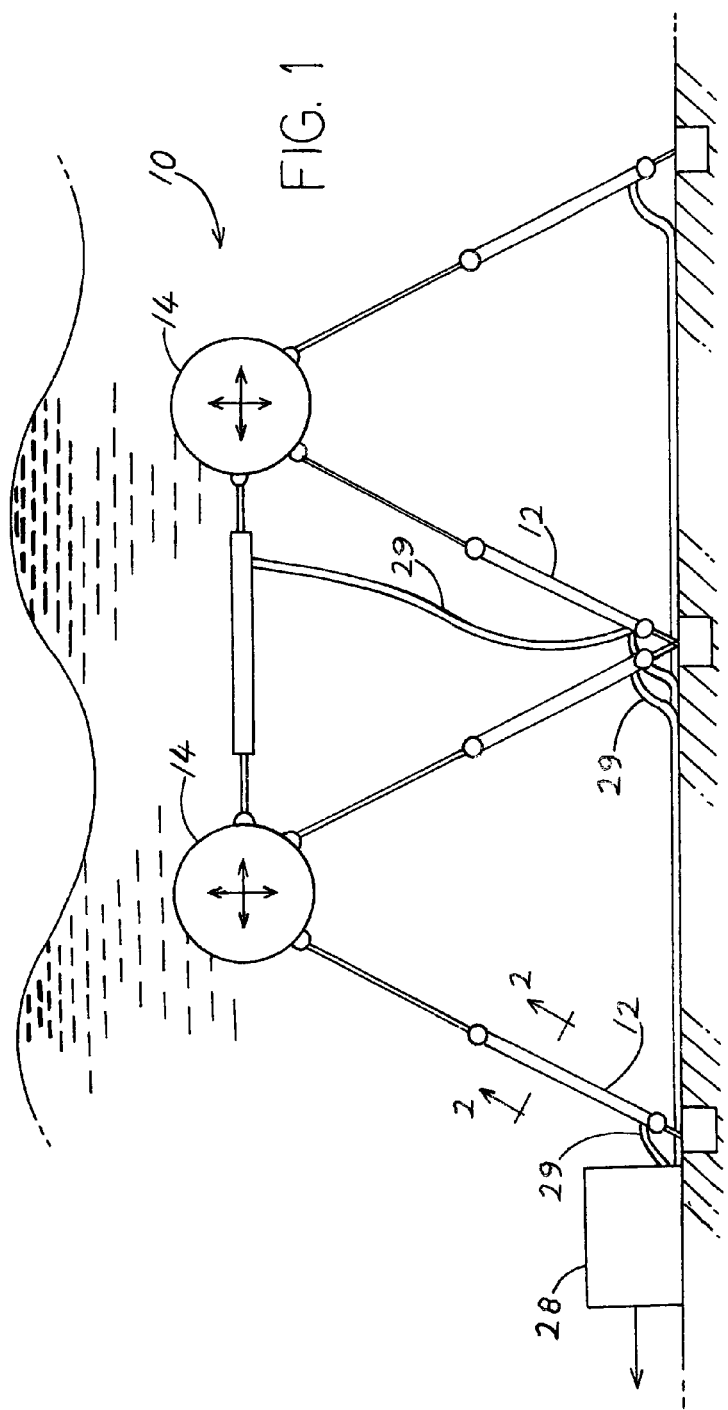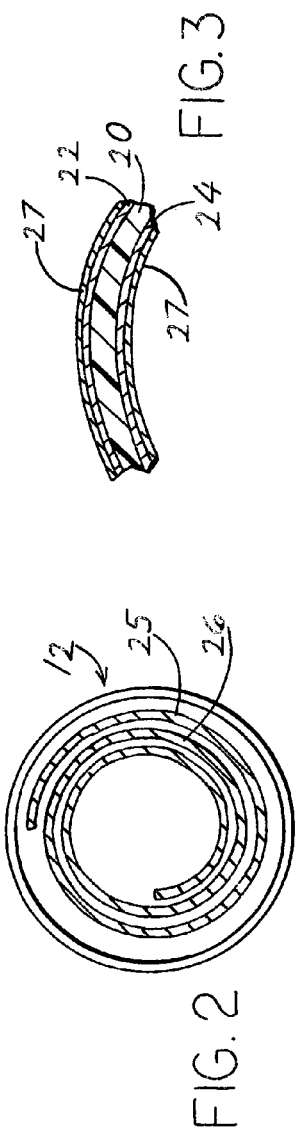

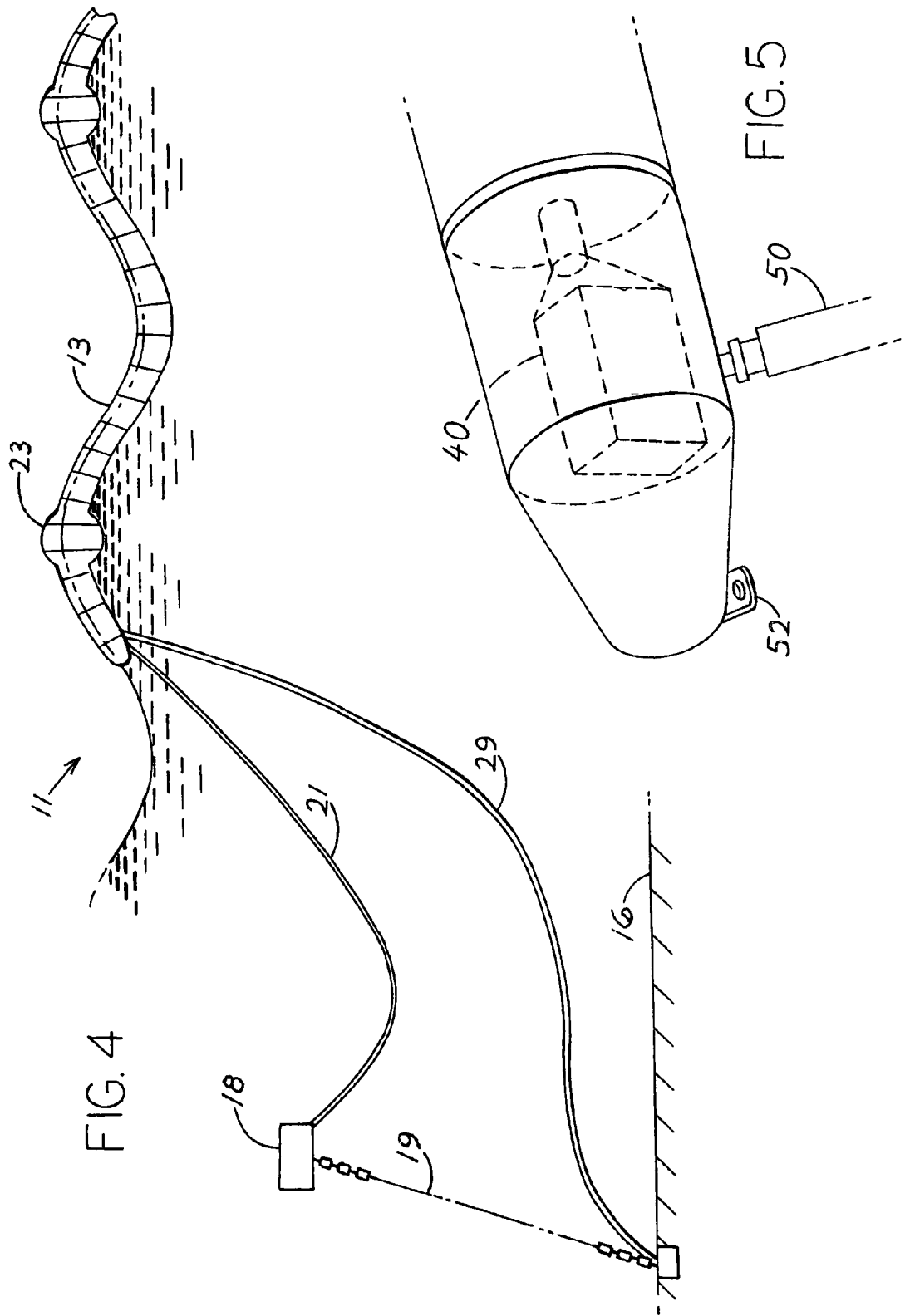

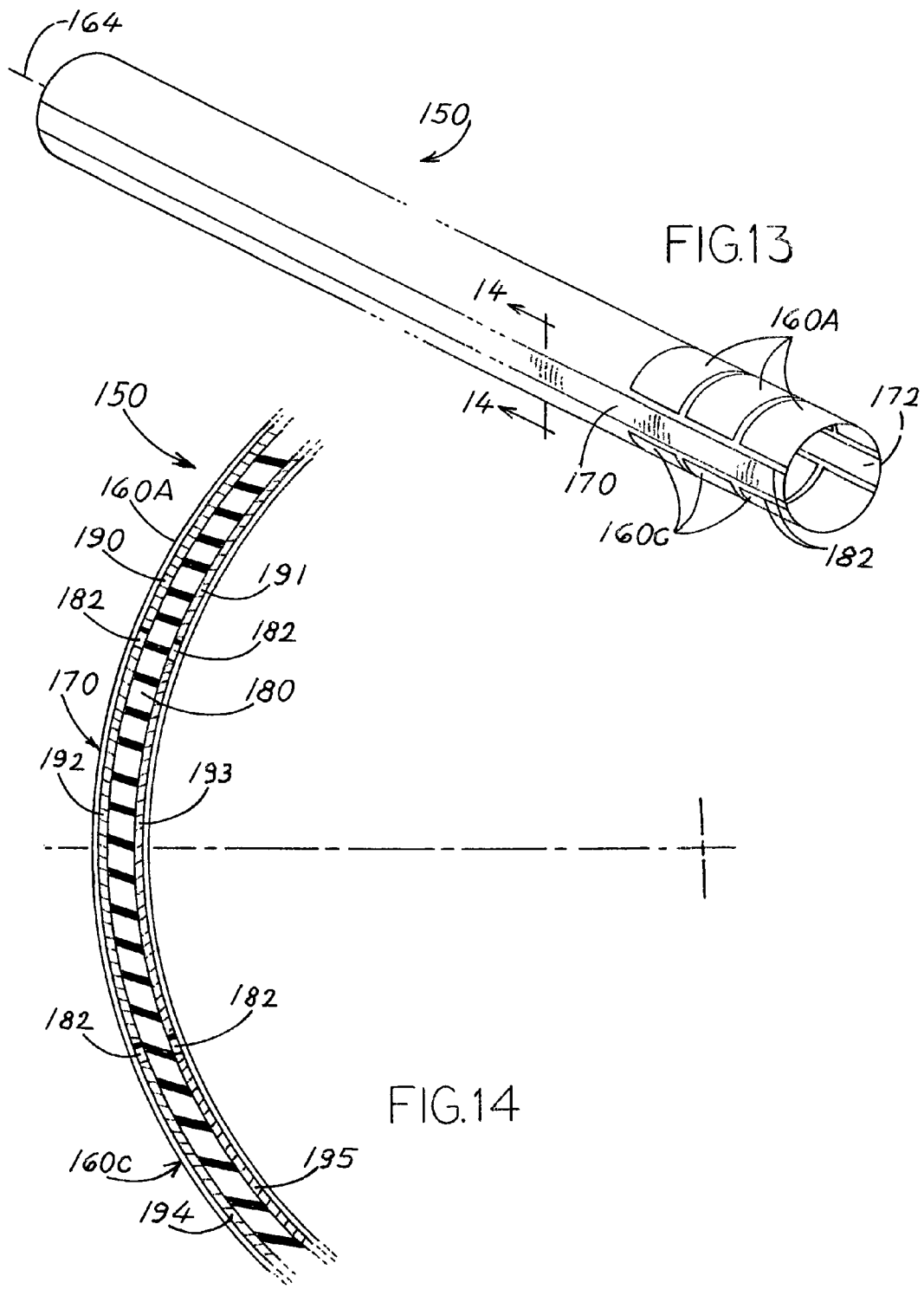

ENVIRONMENTAL ELECTRICAL GENERATOR

CROSS-REFERENCE

Applicant claims priority from U.S. provisional patent application Ser. No. 61/224,329 filed Jul. 9, 2009 and priority from U.S. provisional patent application Ser. No. 61/187,597 filed Jun. 16, 2009.

BACKGROUND OF THE INVENTION

Energy conversion systems are known that can obtain power from varying environmental conditions such as from sea waves by using the waves to move parts repeatedly back and forth.

Applicant's U.S. Pat. No. 7,632,041 discloses a system for generating electrical power from waves, where an electricity-generating stretchable material (SM) is coupled to a static part and to a displaceable part that move with the waves. The SM material functions like a variable capacitor. As a part of the system is moved back and forth, it can be made to repeatedly stretch and relax a quantity (e.g. a sheet) of SM which is preferably EAP (electro active polymer) material. A pair of electrodes lies against the opposite surfaces of a sheet of SM material to create a capacitor, and an electrical charge is applied to the pair of electrodes. When the sheet is stretched, the surface is increased while at the same time the distance between its opposite surfaces is decreased. As a result, the capacitance between its pair of electrodes increases, and the voltage resulting from the charge on its electrodes decreases. Conversely, when a stretched sheet of SM material is partially relaxed, its capacitance decreases and the voltage between the electrodes lying at its opposite surfaces, increases. Electrical power is drawn from a capacitor consisting of pair of electrodes that lie on opposite sides of a relaxing SM sheet, by flowing out the charge (between its pair of electrodes). When the SM sheet is stretched again so the voltage decreases, an electrical charge is again flowed (as current) to the electrodes to recharge them, so the charge can flow out when the voltage has increased again. The fact that electricity flows out of the pair of electrodes (they are discharged) that are at a higher voltage than the voltage at which the electrodes are recharged, results in obtaining power from the system.

The need to repeatedly recharge the electrodes that lie on opposite surfaces of a SM sheet, results in the need for an electrical source that supplies current at the required recharge voltage (e.g. 2500 volts) at the proper times in each cycle of operation. This can require AC/DC conversions and voltage step ups or step downs, which result in power losses that can greatly reduce the efficiency of the energy conversion system. A system that used an internal source for recharging a pair of electrodes could have a greatly increased efficiency. Such a system should be capable of extracting energy from the environment like sea waves, currents or waterflows, using a relatively simple construction.

SUMMARY OF THE INVENTION

The invention concerns an apparatus that consists of interconnected variable capacitors of SM material that generate electricity from environmental forces.

In accordance with one embodiment of the invention, an improvement is provided for a system that generates electricity from the stretching and relaxing of SM (stretchable material), especially for SM material in a (rolled) sheet form so it has primarily parallel opposite surfaces against which a pair of electrodes lie.

The system includes a power extraction unit coupled to the electrodes of at least a pair of capacitors that are activated out of phase with each other. The unit directs an electrical charge (current) from a first pair of electrodes that have a higher voltage, to one or more second pairs of electrodes that have a lower voltage, to recharge the second pair of electrodes. During the current flow electrical power is extracted by the drop in voltage of current passing through the unit.

The power extraction unit is provided with a power control unit that senses the voltage in each of numerous capacitors and flows current between a variable capacitor that has a positive high voltage between its electrodes, to a variable capacitor that has a low or negative high voltage between its electrodes (which can be established by switching them). The current flowing to the second pair of electrodes recharges the second pair of electrodes so it will produce current at a high voltage when its SM sheet is next relaxed.

According to one preferred embodiment of the present invention, the SM sheets are wound, wrapped or rolled in the form of a tube of SM. The tube can be a continuous multilayer wound tube of several SM layers spaced in radial direction or a tube made out of combined segments, rings or tube parts, each acting as a variable capacitor. Capacitor electrodes lie against opposite faces of each of the segments. The tube parts or capacitors may be interconnected in tandem so to form a tube. Segmenting of the tube is also advantageous for fabrication, assembling and maintenance purposes.

The tube floats in a sea and flexes as waves pass along the tube. The segmented tube can be pre-stressed by one or more liquids like water and/or pressured air that are contained within the tube. The contained fluids develop a travelling bulge or standing wave due to the sea waves that are acting on the flexible tube, the travelling bulge locally enlarging the diameter of the tube or a segment of ring shaped SM material which acts as a variable capacitor.

Further it is an option that one or more of the SM layers or segments can be isolated and function not as a variable capacitor for power generation, but as a static capacitor on which the produced electricity of the others variable capacitor segments can be collected and temporary stored as a storage buffer, before exporting it via the power extraction unit to a grid. The power control unit that is connected to the power extraction unit controls the power distribution over the different variable and static capacitors.

The novel features of the invention are set forth with particularity in the appended claims. The invention will be best understood from the following description when read in conjunction with the accompanying drawings.

BRIEF DESCRIPTION OF THE DRAWINGS

FIG. 1 shows a power convertor system containing rolls of SM based capacitors for generating electricity from sea waves that are connected to a power extraction unit.

FIG. 2 is a sectional view taken on line 2-2 of FIG. 1.

FIG. 3 is a more detailed view of a portion of FIG. 2.

FIG. 4 is a side elevation view of another power convertor system that uses a long flexible tube made of ring-shaped tubular segments of SM (stretchable) material for generating electricity from ocean waves.

FIG. 5 is an enlarged view of the nose area of the system of FIG. 2.

FIG. 13 is an isometric view of another tube design that contains several variable capacitor elements and a pair of constant capacitors.

FIG. 14 is an isometric view of a tube segment that forms a constant capacitor

DESCRIPTION OF THE PREFERRED EMBODIMENTS

Figure 6:
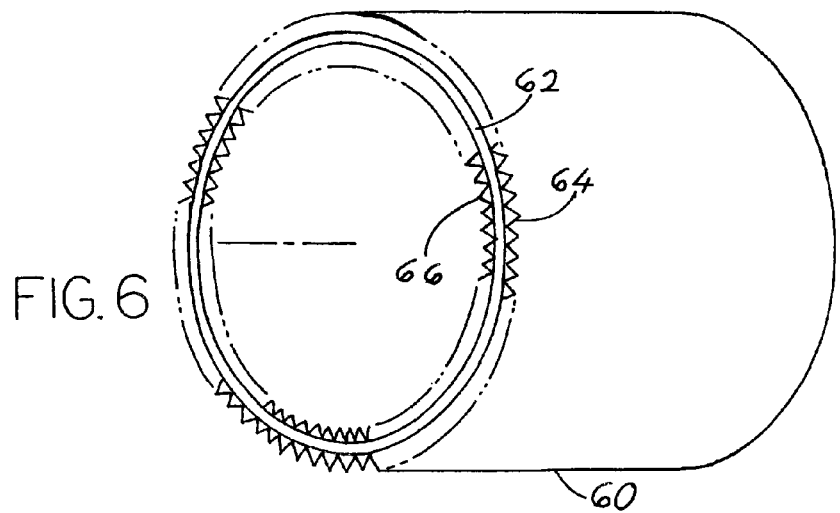
FIG. 6 is a variable capacitor or segment of the tube of FIG. 2

FIG. 1 shows a first wave energy converting (WEC) system according the invention where electrically interconnected variable capacitor devices 12 are used to generate electricity from sea waves. The capacitor devices are rolls of SM material in a waterproof cover and each has an electrical charge on its electrodes resulting in a voltage between its two electrodes. FIG. 2 is a cross-section of one of the capacitor devices showing that the layers such as 25, 26 each includes a sheet of SM and its electrodes, which are wound into a spiral with overlapping layers 25, 26. FIG. 3 shows that the capacitor device includes a sheet 20 of stretchable dielectric material, a pair of compliant electrodes 22, 24 lying against or adjacent to opposite faces of the dielectric sheet 20, and water proof sheets 27 that cover the electrodes. In a system that applicant has designed, there are thirty-eight layers, each having SM material of the EAP (electro active polymer) type of 84 μm (0.084 mm) thickness.

The capacitor devices are connected to buoyant elements 14 and are integrated in the mooring lines that are connected to the seafloor. Even in a quiescent sea (no waves) the main layers of the capacitor devices or rolls are under a pre-tension. When the crest of a wave passes over the apparatus the buoyant member rises in the water and stretches the SM layers of the capacitors. The SM layers become stretched and thinner and the voltage between the pair of compliant electrodes of the capacitor decreases. On the other hand, when the trough of a wave passes over a capacitor the SM layer relaxes, becomes thicker and the voltage between the electrodes of each capacitor-like device increases. The changes in voltage can be used to generate electricity as by passing current between capacitor-like devices that are at different voltages with the current flowing through a load. Therefore the electrodes of each of the capacitors are connected through power cables 26 to a central power extraction unit 28 which is connected to a power export cable and which has a power control unit that regulates and distributes power with respect to the different capacitors.

FIG. 4 shows a second WEC (wave energy converting) system 11 which includes a floating flexible tube 13 with one bow end that is moored by mooring lines 21, 19 to the sea floor 16. The tube consists of multiple segments or capacitors which are in the shape of tubular ring segments. Both ends of the tube are closed and pressurized fluid such as water and pressured air are contained within the tube. Due to sea wave action the fluid contained in the tube creates a travelling bulge 23 of fluid which forces the capacitors to strain in a radial direction and by that enlarge the surface of the capacitor while reducing the thickness of the SM material.

The tube 13 comprises tube walls that include SM (stretchable material). Expansion forces are applied to the tube that initially stretch the tube walls in a radial direction. The tube can contain compressed gas (e.g. air) that places the tube walls under tension and that also keeps the tube floating. Another possibility is a coil (not shown) such as a compression spring, that is compressed in diameter within the tube to thereby expand the tube. The tube may even be a combination of rigid parts (not shown) and flexible parts comprising SM such as EAP on its circumference. These can be used to achieve smaller tube distensibility and thus higher bulge speeds (essential to absorb longer period waves which travel faster). These rigid parts preferably contain buoyancy or ballast to control the depth of the tube. These rigid parts preferably also contain electrical cable trays and power electronics to control the flow of current at each SM segment along the tube length.

It is possible to use a buoy and chain decoupling mooring system for the tube. A chain 21 is attached in catenary shape between at least one end of the tube and a buoy 18. The buoy 18 is attached to the seabed by a taut mooring line 19 which could be an elastomer, PU, TPU, nylon, cable. A power cable 29 carries away electrical power. Another option (not shown) is to attach the buoy 18 to the seabed via a clump weight(s) chain arrangement. The clump weight(s) lift(s) only in survival waves not in normal operational conditions. This arrangement provides dynamic mode decoupling by tuning the heave resonance period of the tube ends to periods longer than waves and/or by providing additional damping at one or both ends of the tube to avoid brutal reflections of the bending wave at the end of the tube. Such a buoy and catenary chain arrangement can reduce considerably or even eliminate the occurrence of snatch loads at the tail, and increases the minimum bending radii in survival waves thereby protecting the tube against buckling, high stresses, delaminating, etc.

Under the tension provided by its mooring system and the wave actions, the elastomeric tube has natural modes (resonant) of bending in the vertical plane. These modes are similar to the modes of vibration of a floating pipeline or more simply a tensioned rope. It is possible to tune the axial effective tension of the tube to obtain several resonant periods in the range of the periods of the waves, therefore providing an ideal conversion mechanism of energy between waves and strain in the tube. Of course, increased tension in an elastic member results in increased stiffness. In particular, it is possible to tune the effective tension in the tube such that the bending waves in the tube propagate at the same (or close to the) speed as the waves. Then under forced excitation from the waves, the wave length of the bending wave in the tube will be the same as the sea wave length. This will result in an optimum energy transfer between wave loads and strain in the tube (combined geometric and time resonance), hence the power harvested from the wave will be increased.

The tubular power generation system can also be provided with horizontal extrusions like wings on each side of the tube (not shown). The wings are subjected to wave loads and mainly lift forces that generate up or down thrust loads which are transmitted to the tubular WEC by the structural anchorage of the wings in the tube. The work done by the wave loads on the wings is used to amplify the vertical motions of the tube relative to the moving sea surface. These deformations are used to produce energy using the SM material. Ideally at least one pair of wings will be located close to the bow of the tube. The wings may be built from rigid, deformable materials (such as elastomers) or even SM materials to harvest energy and/or to actively control the dynamics of the WEC to extract more energy from waves (stiffness, damping control).

An alternative tubular power generation concept, still within the scope of the invention, would be composed of two SM tubes, one inside the other. The two SM tubes are filled with liquid (sea water) and when the bulge passes through the wave energy converter, the outer tube expands while the inner tube contracts and inversely. This allows the system to generate electricity over the complete period of the wave. Each tube is out of phase with the other tube simultaneously.

FIG. 5 shows the power extraction unit 40 with the power control unit of the tube. The power extraction unit is placed in a dry environment in which the electrodes of each of the variable (and constant) capacitors are connected. The power extraction unit is also connected to a high voltage power export cable 50, which is placed at a distance from the mooring line lug 52.

Figure 7:
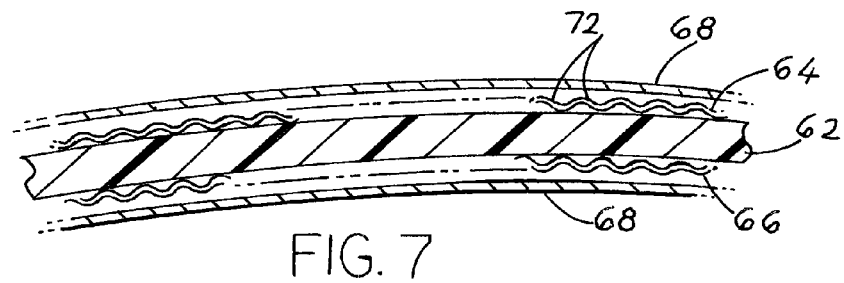
FIG. 7 is a partial sectional view of a portion of the segment of the tube of FIG. 6.

FIGS. 6 and 7 show a variable capacitor or segment 10 which has the shape of a tubular ring segment. The figures show that the tube walls include a layer or sheet of SM (stretchable material) 62 in the form of a tube segment, and a pair of electrodes 64, 66 located at opposite faces, or surfaces of the sheet. The sheet of SM material serves as a capacitor dielectric while the electrodes serve as capacitor electrodes, to form a variable capacitor. A pair of isolation layers 68 isolate the electrodes from water and other elements in the environment. It is possible to provide isolation films between pairs of layers but such films generally do not affect operation.

The capacitor dielectric is made from SM material, and the compliant electrodes are provided over at least 50% of its surface, and constructed of so called Electro Active Polymer (EAP). The capacitors are preferably made of a wound or rolled sheet of dielectric material with compliant electrodes at both surfaces. To be compliant the electrodes can have corrugations 72 (FIG. 7) which are parallel to the tube axis (FIG. 6). The capacitor segment 60 is contained in a waterproof outer cover made of a stretchable material, as well as a flexible and waterproof inner liner or layer so that the liquid that is contained inside the tube cannot reach the electrodes of the capacitor. Due to sea wave action the liquid contained in the tube that is formed by these capacitors, creates a travelling bulge of liquid which forces the ring shaped capacitors segments to strain only in a radial direction and by that enlarge the surface while reduce the thickness of the SM material. It is an option to have each variable capacitor element in a generator mode in which power is generated or in an actuator mode so that when power is applied the capacitor element contracts/relaxes which enables an adjustment and control of the travelling bulge.

In a system designed by applicant, the main layers of each of the interconnected capacitors change in surface and thickness, which induces changes in voltage. In order to obtain a higher performance, the multilayer arrangement for the tube and/or for each of the segments of the tube is preferred. The multilayer arrangement includes a layer of high dielectric constant material, layers of high conductivity material for electrodes and layers of waterproof material. Also one or more layers of a stretchable material like an elastomer can be added between the layers which could also be in a corrugated shape. Further, alternate layers of stiff elastomers (Young's Modulus of Elasticity higher than $50 \times 10^6$ psi) with layers of dielectric EAP films with smaller Modulus (typically 1 to $20 \times 10^6$ psi) can increase the energy density of the SM material. The relatively stiff elastomer limits stretching of the SM as it prevents it from expanding too much under a high electrical field i.e. it minimizes the actuation effect and optimize generator performances.

Several layers of SM material are wrapped as a tube segment which is sandwiched between many layers of water barrier film. The tube is further provided with an outer waterproof and protecting cover. The SM material is made in sheets with a length of tens of meters and is rolled or wrapped into a tube segment, a roll or a ring segment. The outer, last part of the SM sheets do not need to have a flexible electrode layer. The end part will be wrapped several times around the SM part to protect the electrodes against water ingress or diffusion while it still allows for the segment to expand and retract.

Another method of limiting the axial expansion of a segment or the complete tube is to add axial restrainers like ropes, cables, strips, nets, braids etc. or even SM materials that contracts when a voltage is applied (actuators). Not only will it limit the elongation of the segment or tube, it also can support in forcing the segment to expand locally in an axial direction due to the travelling bulge of pressurized fluid that is captured within the tube which is created by the wave actions.

Figure 8:
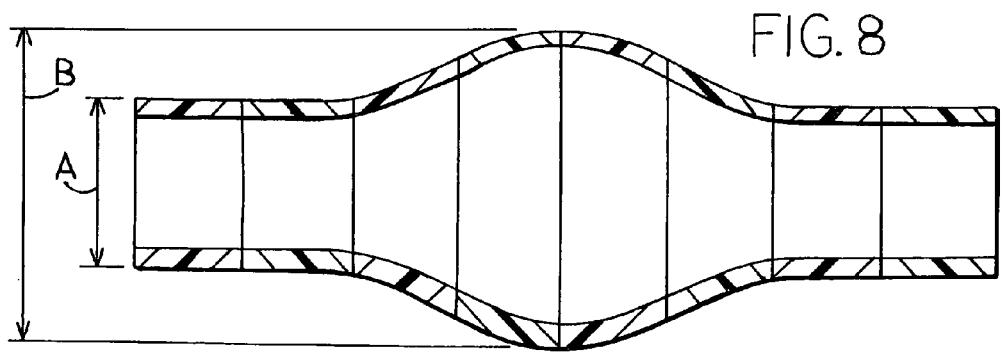
FIG. 8 is a partial segmental view of the tube of FIG. 4, showing several SM segments with enlarged diameter due to an internal travelling fluid bulge.

FIG. 8 shows a part of a tubular power generator system in which some of the ring-shaped segments or variable capacitors, each of them connected with the power control unit, are radially expanded (B) from an initial diameter A due to a travelling bulge of fluid that is contained within the tube and which is created by the waves that are acting on the tubular power generator system.

Figure 9:
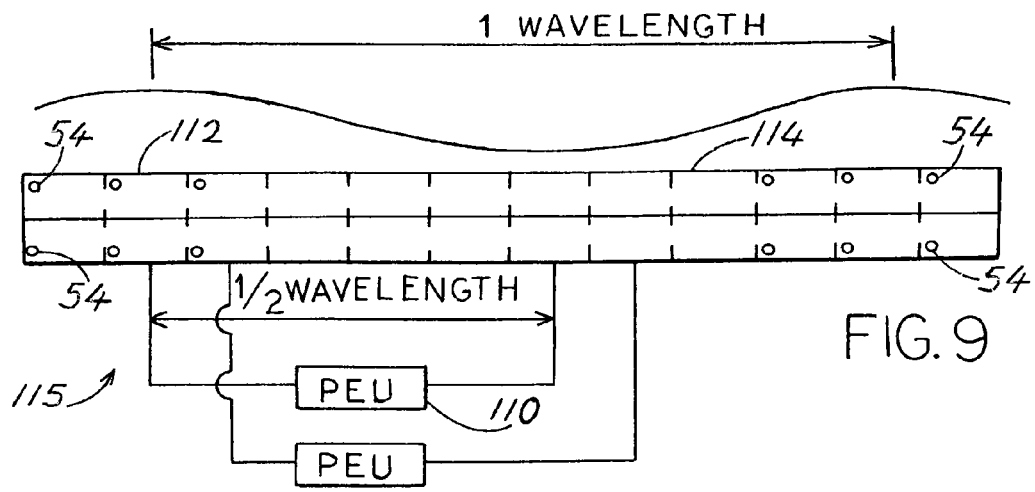
FIG. 9 is a schematic diagram of the power converter system including the power extraction unit with interconnected power control unit

FIG. 9 shows a schematic view of the variable SM capacitors that are connected to a power extraction unit. The power extraction unit is connected to a grid via a high voltage power export cable. A capacitor is initially charged so a voltage such as 2500 volts exists between its pair of electrodes.

The voltage between two electrodes of a capacitor is given by:

$$V=q/C$$

where V is the voltage, q is the electric charge on the capacitor electrodes, and C is the capacitance of the capacitor. Where a capacitor consists of two parallel plates that form the electrodes and a plate of dielectric material between the electrodes, the capacitance is given by:

$$C=e(A/D)$$

where C is the capacitance of the capacitor, e is the dielectric constant of the dielectric material, A is the area of each electrode, and D is the separation of the electrodes.

When a segment lies at the crest of a wave and the SM sheet arrangement is stretched due to the travelling bulge, the thickness of the SM sheet is decreased so the distance D between its pair of electrodes is decreased, its area increases, and its capacitance increases. As a result there is a decreased voltage between the electrodes. After a time on the order of magnitude of a few seconds when the bulge passes, the segment will be relaxed (and the voltage between its electrodes will be increased).

Electrical power can be extracted from the electricity generators by flowing out the charge (i.e. flowing a current) from a pair of electrodes of a first capacitor, which are at an increased voltage (because its SM sheet stretching has been relaxed) so the current outflow does useful work, such as to create a current flow in a power line. Such outflow results in a decreased charge between the electrodes of the first capacitor, with the voltage tending to drop to a very low level as the sheet of SM material is stretched. The charge is later replaced by flowing a charge (current) into the electrodes of the first capacitor at a low voltage to prepare for the next cycle. Applicant obtains such replacement charge in a simple and efficient manner. In fact, a tube is composed of several SM segments, each segment requiring a cable to be charged and to be discharged. In order to avoid the use of numerous underwater cables, electrodes are placed in a layer of the tube on each segment, the electrodes being connected to the power control unit via a conductive cable integrated within the layer of the tube. Therefore it is possible to charge and discharge independently each SM segment of the tube.

Figure 10:
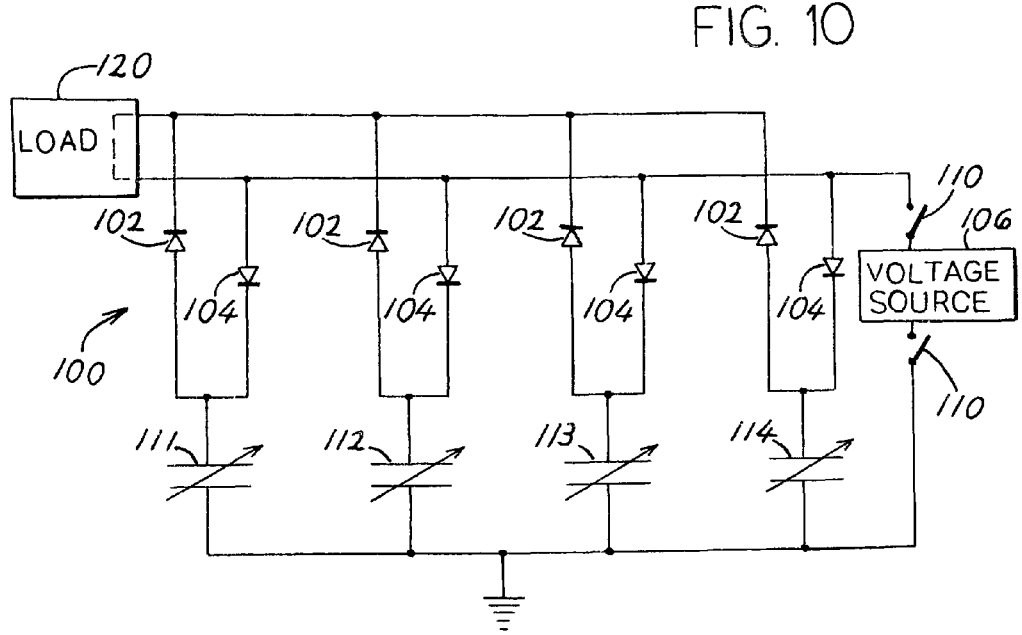
FIG. 10 is a schematic diagram of the power converter system

The diagram of FIG. 10 shows a power extraction/power control unit that is connected to a pair of capacitors 112, 114 whose voltage changes are close to 180° out of phase. It shows a system 100 (that can be grounded or not) that uses diodes 102,104 to flow out current from capacitors 111-114 at high voltages, to extract energy by dropping the voltage, and to flow the current to capacitors at low voltages. A startup charger 106 charges some of the capacitors (e.g. to 2500 volts) at the beginning of operation of the system, and then is disconnected by switches 110. When capacitors such as 111, 113 each has its sheet of SM relaxed so its voltage increases, current flows through diodes 102 to a load 120. The load 120 decreases the voltage and passes the current through diodes 104 to other capacitors 112, 114 that are at lower voltages. Similarly, when capacitors such as 111, 113 each has its sheet of SM stretched so its voltage decreases current flows from capacitors 112, 114 through diodes 102 and through load 120 and through diodes 104 to the capacitors 111, 113 to increase their voltages.

FIG. 9 shows the passage of current between two capacitors 112, 114 that are a half wavelength apart (of sea waves). The length (and period) of sea waves varies so it can be difficult to know when two capacitors are a half wavelength apart. Instead applicant can efficiently remove energy by the use of voltage sensors 54 that sense the voltage across each capacitor at all times. Current is passed between capacitors whose voltage difference is above the average voltage of all capacitors. For example, where the average voltage across all capacitors is 2500 volts, the power extraction unit (PEU) which also called the power control unit 110 finds that the voltage across capacitor 112 is 3000 volts and the voltage across capacitor 114 is 3000 volts. The PCU passes electricity from one capacitor, through a load (e.g. 120 in FIG. 9) to the other capacitor, so the current flow is moved by a voltage difference of 6000 volts.

In a system that applicant designed, the SM (stretchable material) was initially stretched by 1.4 times its respective unstretched length. That is, each sheet initially was 40% longer than its unstretched length. The maximum stretching of each sheet was about 1.7 times its unstretched length. The maximum relaxation results in each sheet being relaxed so it is stretched to only about 1.1 times its unstretched length.

In the above system, the capacitance of each capacitor increases from about 67 microfarads to 100 microfarads and decreases to about 42 microfarads in each cycle.

The power control unit 110 of FIG. 9 can be connected to a pair of capacitors at 112 and 114 that are separated by about a half wavelength of the ocean waves. In that way, one of the generators is developing an increased voltage and power can be extracted, while the other generator is developing a decreased voltage and requires an increased electrical charge. The wavelength may change, and the power control unit can be connected to different pairs of capacitors that are about 180° out of phase in their stretching and relaxation at any given time. Actually, the power control unit can be connected to more than two capacitors and preferably has voltage sensors connected to all capacitors. The capacitors between which charges are passed can be chosen on the basis of their voltage at any given time, or their expected voltages.

Figure 11:
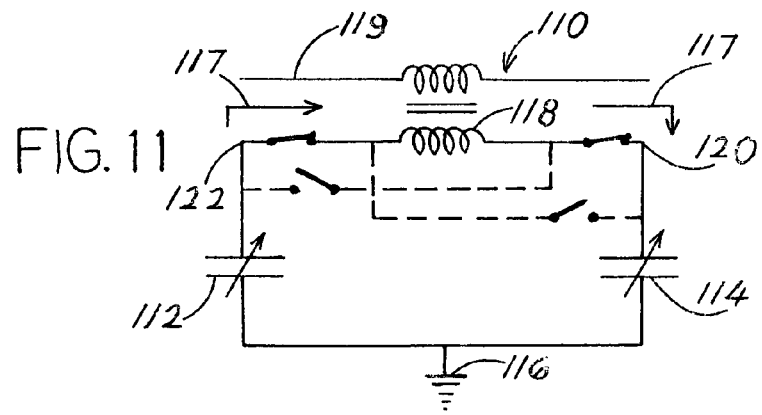
FIG. 11 is a schematic diagram of one form of power control unit of the system during the outflow of a charge (current) from a first capacitor to a second one.

FIG. 11 shows two variable capacitors 112, 114 as part of a circuit. The circuit has a reference potential at 116 which may be a ground potential for each capacitor. When the voltage on capacitor 112 increases, while the voltage on capacitor 114 decreases, the unit 110 allows current to flow, as indicated by arrows 117 from the first capacitor 112, through an impedance 118 that forms a power-absorbing device to the second capacitor 114. In FIG. 11, the power-absorbing device 118 is a coil that induces current in a power line 119. As a result of drawing off power, the voltage at point 120 is lower than the voltage at point 122. The voltages are referenced to the reference voltage at 116.

Figure 12:
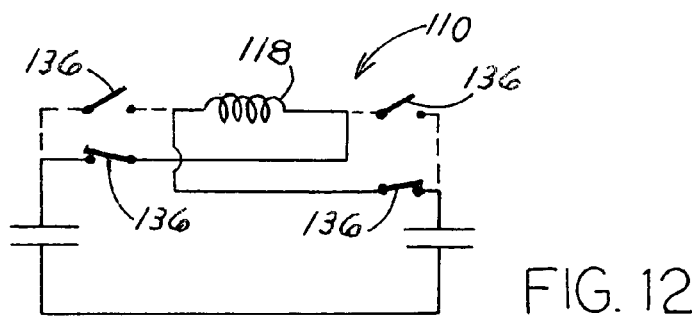
FIG. 12 is a view of the diagram of FIG. 9 during the flow of a charge from the second capacitor back into the first capacitor.

Although power is drawn off the first capacitor 112, all of the electrical charge drawn off first capacitor 112 is directed to the second capacitor 114 to recharge that capacitor 114. When the second capacitor 114 next has its voltage increased (by its SM sheet relaxing), the current on the second capacitor 114 is directed through the power-absorbing device 118 back to the first capacitor. FIG. 12 shows the power control unit 110 with switches 136 that have been operated to enable such reverse flow. The power-absorbing device 118 is shown as a coil that induces current in the power line, but it can be any of a wide variety of devices such as a resistor that creates heat.

In the power control system of the invention, applicant can provide at least one large capacitor to store generated electricity at a largely constant voltage before it is offloaded to an electrical load. Such largely constant voltage capacitor also can provide electricity to charge the variable capacitors that generates electricity in the manner described above.

FIGS. 13 and 14 show a long tube 150 that lies in the sea and that forms constant capacitors 170, 172. The tube 150 has pairs of electrodes that form upper and lower rows of capacitors 160A and 160C, with the capacitor spaced along each row. Voltages across the capacitors change as the tube bends in the waves. The row direction is primarily parallel to the tube center line 164. In addition, the tube has a pair of largely constant voltage storage capacitors 170, 172 that each extends along much of the length of the tube.

FIG. 14 shows that the tube 150 has dielectric SM (stretchable material) tube walls 180 and capacitor electrodes with gaps 182 that define the different capacitors 160A, 160C, 170 and their pair of capacitor electrodes 190, 191 and 192, 193 and 194, 195. The constant capacitors 170, 172 each extends along the tube length by the length of at least seven of the electricity-generating capacitors 160A, 160C, or at least seven times the average tube diameter.

The tube 150 made of SM material will, as it expands and contracts, have its own period of vibration or its own resonance period. It is preferred to have a resonant frequency of the SM tube close to the period of excitation from sea wave. The period is a function of the length of the SM tube and by controlling the length the period is controlled as well which can be done by having parts, layers or segments of SM material acting like actuators. If the SM material is in an actuator mode, a voltage is applied on the actuator so that the SM material retracts or extends so the length of the tube can be adjusted. By controlling the voltage applied, it is possible to control the length of the tube and hence its oscillation period.

In an alternative embodiment (not shown) according to the present invention, applicant proposes to use at least one independent tension member, separated from the elastomeric tube, connecting the bow and stern end caps of the tube or mattress. This provides a strength member to transfer the mooring force from bow to stern and to avoid excessive strains in the elastomeric part of the tube in the axial direction. By preventing axial expansion when the tube is pressurized, the tension member also may be used to prevent the build up of an aneurism. The tension member also reduces the fatigue loading on the axial fibers contained in the elastomeric part of the tube, or it may allow the WEC to work without axial fibers in the elastomeric part, which will improve the fatigue life of the WEC hence its service life. Preferably, the tension member is located inside the tube. It may be used as an electrical power transmission cable to exchange power with the EAP generators along the tube and guiding systems may be included inside or outside the tube to prevent contact between tension member and elastomeric tube. The tension member may be a pipe, a cable of any material with high strength, toughness and modulus (at least 2 orders of magnitude higher than the elastomer used for the tube).

The tension member may also be used as a SM generator to harvest energy from axial strain and/or as an actuator to modify the length and resonant modes of the tube.

Thus, the invention provides a system for extracting energy from electrical generators that each includes a plurality of capacitors that each has a primarily sheet-shaped dielectric of stretchable material (SM) and a pair of electrodes at opposite faces of the dielectric sheet. The dielectric is sheet shaped because it is of largely uniform thickness. The SM sheet (rolls, wrapped, rings, tubes) is positioned so it is repeatedly stretched and relaxed by parts that repeatedly move back and forth, such as parts that repeatedly move with the waves. Parts that rotate are the equivalent of parts that move back and forth. A power control unit (PCU) preferably has voltage sensors that sense the voltage across each of multiple capacitors, and partially discharges capacitors when their voltages are above the average capacitor voltage. The sheet of SM material is preferably wrapped in the shape of interconnected tube segments that float in a sea and that have electrodes lying against its opposite faces.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A power converter system for use in a sea that has waves, and a sea surface and that is useful to extract energy from the sea which includes at least one floating body that floats near the sea surface and that is moored to limit drift away from a predetermined location over the sea floor, with said at least one floating body having a plurality of body parts that each moves back and forth as waves pass by, and a plurality of capacitors that each comprises a primarily sheet-shaped quantity of stretchable material SM having primarily parallel spaced surfaces and a pair of electrodes each lying against a different one of said surfaces and with each pair of electrodes forming a capacitor with a charge that creates a voltage between the pair of electrodes, with each quantity of SM coupled to at least one of said body parts so as the body part moves back and forth the body part stretches the sheet of SM to expand and then relaxes the sheet of SM to contract, to thereby cause the voltage across each pair of electrodes to respectively decrease and then increase, including:
   a power extraction unit which is connected to the electrodes of each of a plurality of said capacitors, said power extraction unit constructed to flow current from a first pair of said electrodes to a second pair of said electrodes, while obtaining electrical energy from the flow of current through an impedance between said pairs of electrodes;
   said power control unit includes means for sensing the voltage across each of a plurality of said capacitors, and for connecting said electrodes in dependence upon the voltages across said capacitors;
   said system comprises a flexible elongated tube that is maintained under tension and that is made of SM with said tube floating in the sea extending primarily parallel to the sea surface and containing a fluid so that when waves are acting on the tube the tube bends;
   each segment is provided with a pair of flexible electrodes, on each side of the SM, said power extraction unit being coupled to each said pairs of electrode;
   said power extraction unit is constructed to vary a tension of said tube, in order to make the tube resonance periods close to the periods of excitation urged by sea waves.

* * * * *